United States Patent [19]
Daoud

[11] Patent Number: 6,032,420
[45] Date of Patent: Mar. 7, 2000

[54] INTERNALLY MOUNTED RETRACTABLE WEATHER SHIELD

[75] Inventor: Bassel Hage Daoud, Parsippany, N.J.

[73] Assignee: Lucent Technologies Inc., Murray Hill, N.J.

[21] Appl. No.: 09/105,332

[22] Filed: Jun. 25, 1998

[51] Int. Cl.[7] .................................................. E04B 1/346
[52] U.S. Cl. ........................... 52/67; 312/322; 312/323; 312/319.2; 16/321; 16/335; 49/501
[58] Field of Search ................. 52/67; 312/322, 312/323, 319.2; 16/321, 335; 49/501

[56] References Cited

U.S. PATENT DOCUMENTS

| | | |
|---|---|---|
| 3,067,813 | 12/1962 | Henatsch . |
| 3,845,591 | 11/1974 | Stine . |
| 4,522,246 | 6/1985 | Bierbrauer et al. . |
| 4,635,699 | 1/1987 | Kauffman et al. . |
| 4,784,429 | 11/1988 | Hodges . |
| 4,925,258 | 5/1990 | Ludwig et al. ........................... 312/323 |
| 5,156,195 | 10/1992 | Wehler et al. . |
| 5,215,366 | 6/1993 | Givens .................................. 312/351.3 |
| 5,399,010 | 3/1995 | McClung et al. ..................... 312/334.1 |
| 5,645,333 | 7/1997 | Sakurai .................................... 312/322 |

Primary Examiner—Christopher T. Kent
Assistant Examiner—Nkeisha J. Maddox

[57] ABSTRACT

An internally mounted retractable weather shield for protecting the interior of an outdoor structure from the elements, comprising a base panel; a mounting hinge for hingably mounting the base panel within the structure at a mounting point proximate an upper portion of the structure; the base panel being hingably movable between a stored position wherein the base panel is stored within the structure and overlying the interior and to a deployed position wherein the base panel extends from the mounting point substantially perpendicular to the interior so as to shield the interior from the elements; and wherein the base panel is alternately biased in at least one of a first and second directions via the mounting hinge.

32 Claims, 5 Drawing Sheets

FIG. 2A  FIG. 2B
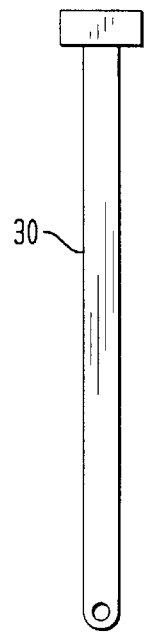
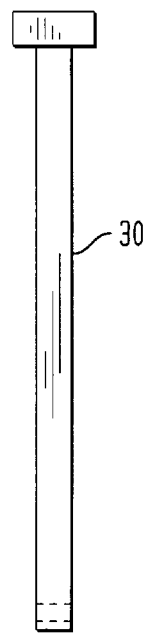
FIG. 3
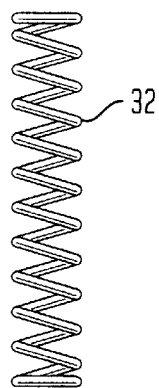
FIG. 4A  FIG. 4B  FIG. 5
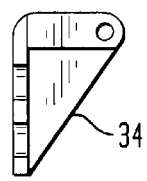
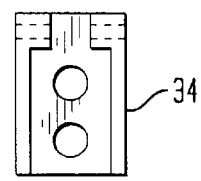
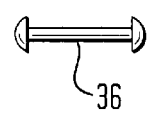

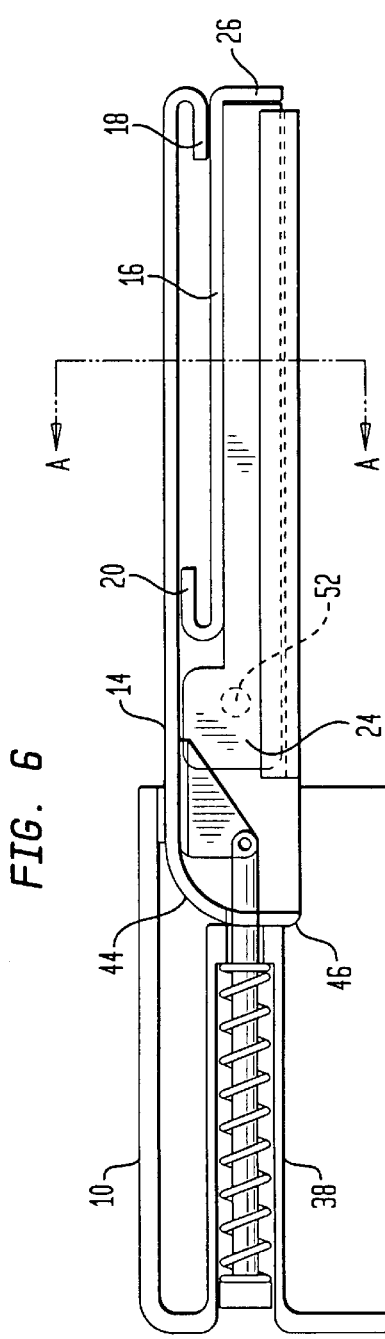
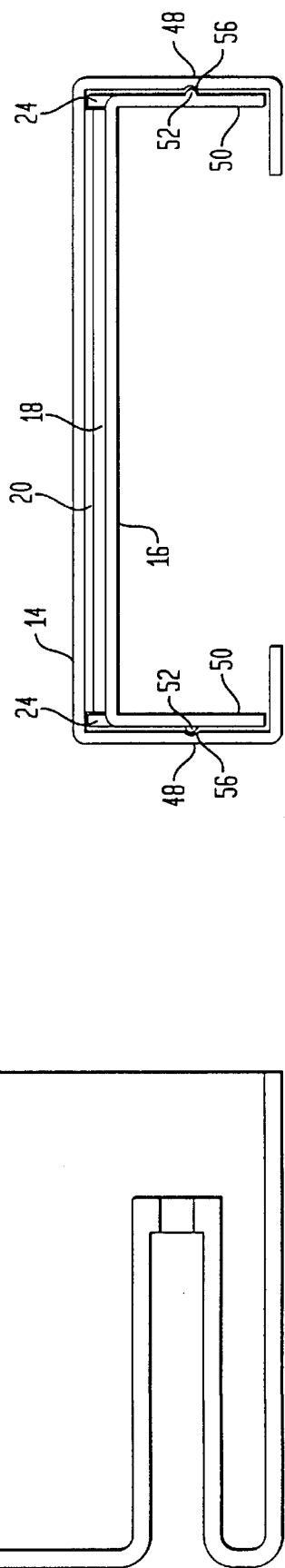

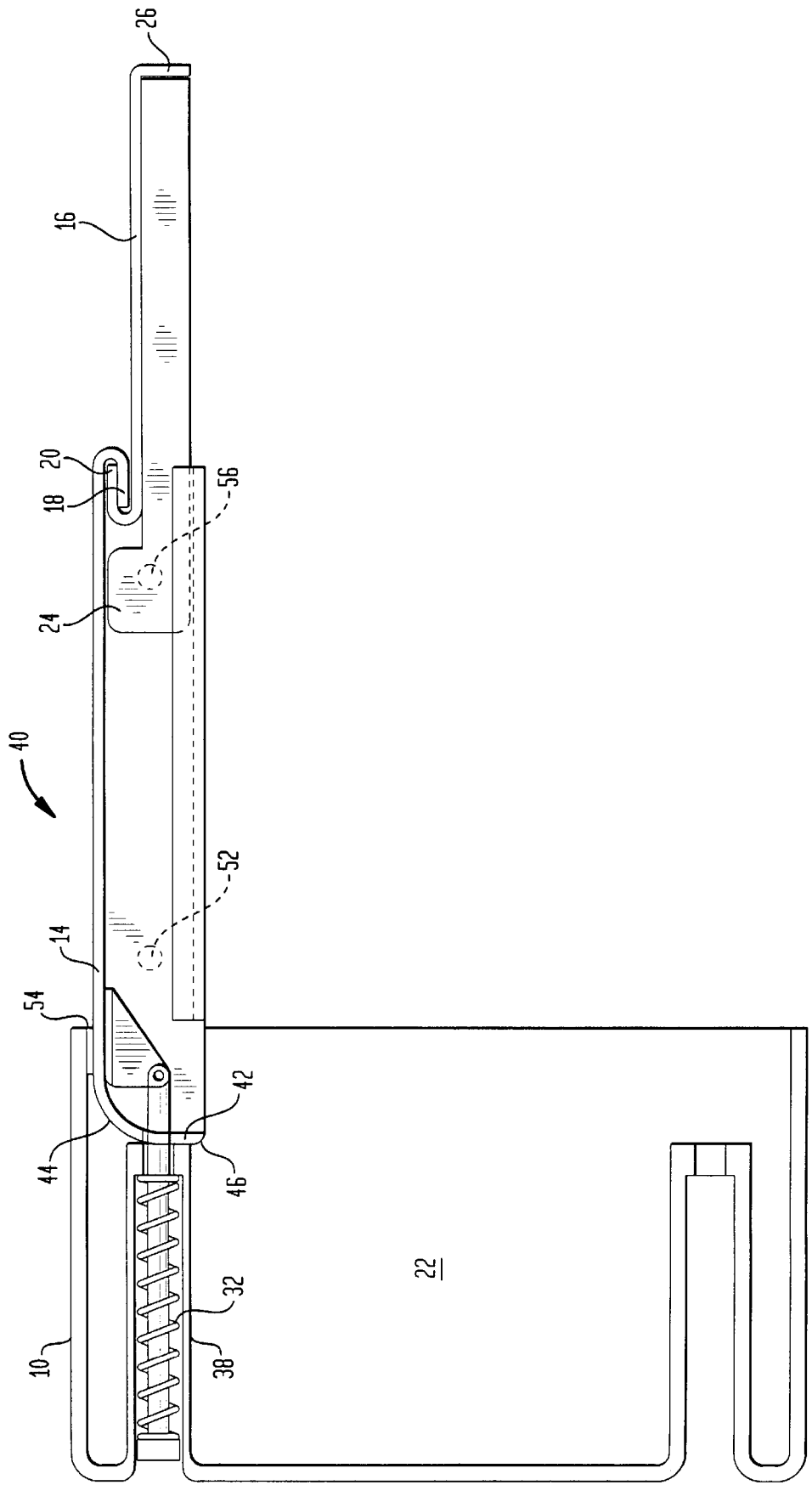

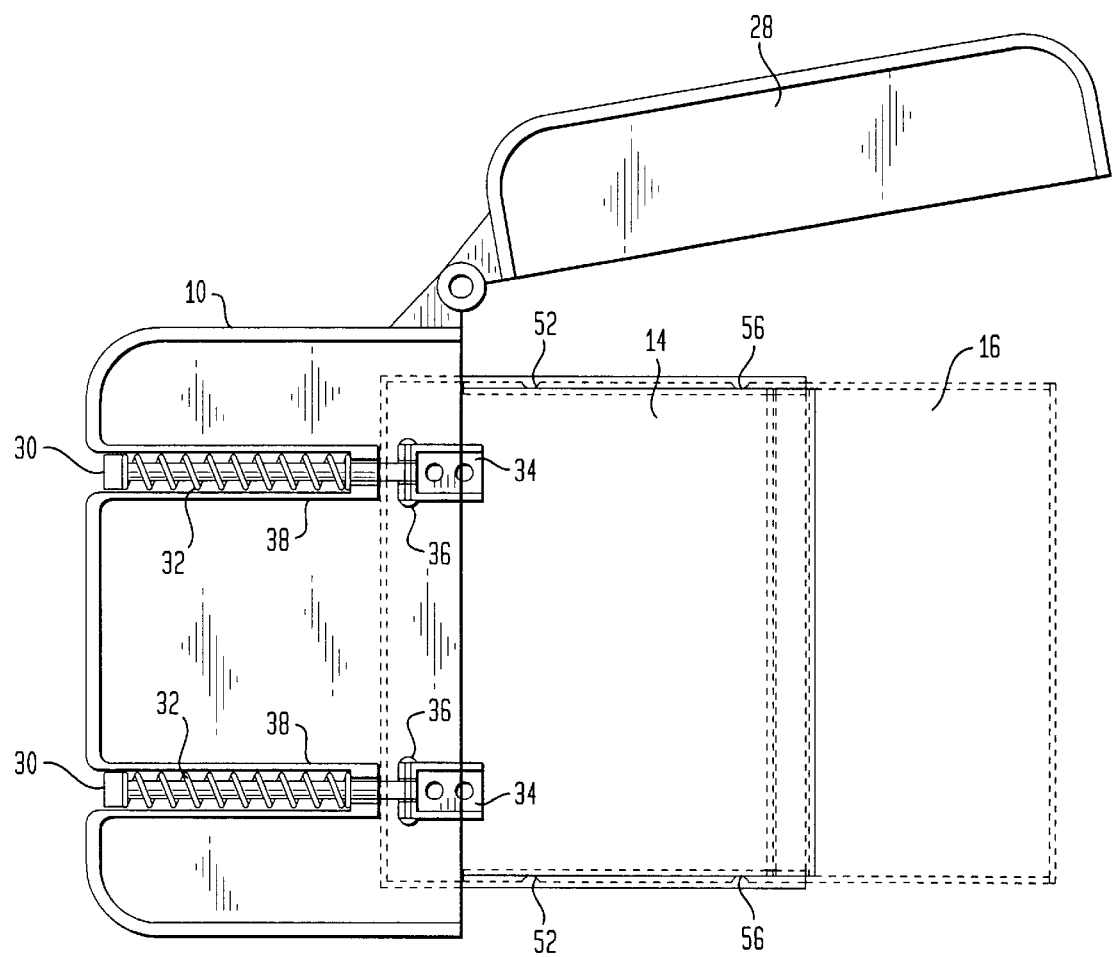

INTERNALLY MOUNTED RETRACTABLE WEATHER SHIELD

FIELD OF THE INVENTION

This invention relates to a weather shield for use with an outdoor junction box containing electrical components, and in particular, to an internally mounted retractable weather shield for use with an outdoor building entrance protector.

BACKGROUND OF THE INVENTION

Junction boxes have long been used to collect and protect telephone and electrical wires for distribution, splicing, cross connection and other uses. In the telephony arts, such junction boxes are more commonly known as network interface units (NIUs) and/or building entrance protectors (BEPs).

In a telephone network, a network cable from the central office is connected to a building entrance protector (BEP) located at the customer site, where the individual telephone lines are broken out line by line. The network cable, which consist of a plurality of tip-ring wire pairs that each represent a telephone line, is typically connected to a connector block that is an integral part of the BEP. Such connectors may be, for example, the ubiquitous 66-type punch down connector, or an SC 99 type connector block, such as are available from Lucent Technologies Inc. The customer telephone equipment is coupled through the connector block to a central office (CO) telephone line. The CO line side of the connector is generally the bottom side of the connector block, where the CO line tip-ring wire pairs are connected using a wire-wrapping tool.

The BEP may, of necessity be located outdoors. The BEP is generally located at eye level for the convenience of the technicians who service such equipment. The BEP has a lockable outer door to protect the electrical components from the weather and for security and other reasons. Frequently, it is necessary to open the BEP for servicing or maintenance. Such servicing will at times occur during inclement weather, such as rain, snow, or sleet. When the BEP is opened for servicing during such weather, the electrical components are exposed to the inclement weather, which could cause electrical short circuits, pose electrical shock hazards for the technician, or otherwise damage the electrical components. A shield is needed to prevent the inclement weather (elements) from contacting the electrical components. A shield is also needed to protect the technician from the elements, which can also include protecting the technician from the harmful rays of the sun. A large, fixed weather shield is not a viable option because it would be unsightly and be hazardous to passersby as most BEP's are located at about eye level. Also, a fixed rain shield would have to be constructed to resist the constant effects of wind, the weight of snow, or accidental collision. Accordingly, an internally mounted retractable weather shield that can be easily and quickly deployed is desired.

SUMMARY OF THE INVENTION

The present invention provides an internally mounted retractable weather shield. The weather shield can be easily and quickly deployed by the technician servicing the BEP upon opening the BEP.

The retractable rain shield of the present invention consists of a single base panel, or a plurality of slide-type telescoping panels mounted to a base panel, which is hingably mounted within the BEP. The shield can be constructed of metal or plastic or any other suitable material having the necessary rigidity and weather resistant characteristics. The base panel is hingably mounted to an upper portion of the BEP by a spring loaded mounting hinge. The base panel, and, optionally the telescoping panels therein, is hingably movable between a substantially vertical closed position wherein the panel lies within the BEP behind the door of the BEP, and a substantially horizontal open position wherein the panel extends over and beyond the front of the BEP. The mounting hinge and base panel are constructed such that the shield is biased toward one or the other open and closed positions. That is, when the shield is rotated upward from the closed position towards the open position, once the shield passes the approximate half way point, the shield is biased towards an open, generally horizontal position. When the shield is rotated downward from the open position towards the closed position, once the shield passes the approximate half way point, the shield is biased towards a closed, generally vertical position.

The base panel is the largest panel, and each successive telescoping panel, if so provided, is progressively smaller. The panels have mutually opposing hooks that allow each panel to engage and interlock with the next larger panel upon deployment of the shield. Upon full deployment, the mutually opposing interlocking hooks also prevent water from flowing backward towards the BEP. Each telescoping panel has a stabilizing portion rearward of the interlocking hook which maintains contact with the underside of the top of the next larger panel. The stabilizing portions help provide a more stable structure when deployed. The stabilizing portions can also be constructed so as to provide a downward tilt to the shield upon deployment to aid in channeling rain away from the BEP.

The innermost panel, which is the smallest panel, has a front wall which acts as a built-in handle to aid in deployment. To deploy the shield, a technician or other user pulls the handle on the innermost panel. As the smallest panel deploys to its fullest extent, a hook at the rear portion of the smallest panel engages an opposing hook on the front end of next larger panel, if so provided, causing that panel to also be pulled out. Each successive panel is equipped in similar fashion, causing successive deployment of the next largest panel as the pulling force continues. The technician can deploy each successive panel by merely continuing to pull until all panels are deployed, or the shield can be deployed only partially. The panels also have a similar engaging feature to facilitate closing, whereupon when the technician wishes to close the shield, the technician pushes the innermost shield back towards the BEP and the innermost shield engages the next larger shield and so on until the shield is fully retracted.

The upper, outwardly facing top surface of the base panel, and any telescoping panels within, may be sloped or somewhat v-shaped, i.e., where the center is higher than the sides, to aid in guiding water towards the sides of the shield and away from the BEP. Accordingly, upon deployment, the electrical components in the BEP, and the technician working thereon, are protected from the elements.

Other objects and features of the present invention will become apparent from the following detailed description, considered in conjunction with the accompanying drawing figures. It is to be understood, however, that the drawings, which are not to scale, are designed solely for the purpose of illustration and not as a definition of the limits of the invention, for which reference should be made to the appended claims.

DESCRIPTION OF THE DRAWING FIGURES

In the drawing figures, which are not to scale, and which are merely illustrative, and wherein like reference numerals depict like elements throughout the several views:

FIG. 2A is a front elevational view of the retention pin of the mounting hinge depicted in FIG. 1;

FIG. 2B is a side elevational view of the retention pin of the mounting hinge depicted in FIG. 1;

FIG. 3 is a front elevational view of the spring of the mounting hinge depicted in FIG. 1;

FIG. 4A is a side elevational view of the hinge bracket of the mounting hinge depicted in FIG. 1;

FIG. 4B is a front elevational view of the hinge bracket of the mounting hinge depicted in FIG. 1;

FIG. 5 is a side elevational view of the hinge pin of the mounting hinge depicted in FIG. 1;

FIG. 6 is a side elevational cutaway view of a retractable weather shield mounted to a structure in its open position and constructed in accordance with a preferred embodiment of the present invention;

FIG. 7 is a sectional view taken along line A—A of FIG. 6;

FIG. 8 is a side elevational cutaway view of a retractable weather shield mounted to a structure in its open and fully extended position and constructed in accordance with a preferred embodiment of the present invention;

FIG. 9 is a top plan view of a retractable weather shield mounted to a structure in its open and fully extended position and constructed in accordance with a preferred embodiment of the present invention;

DETAILED DESCRIPTION OF THE PREFERRED EMBODIMENTS

Figure 1:
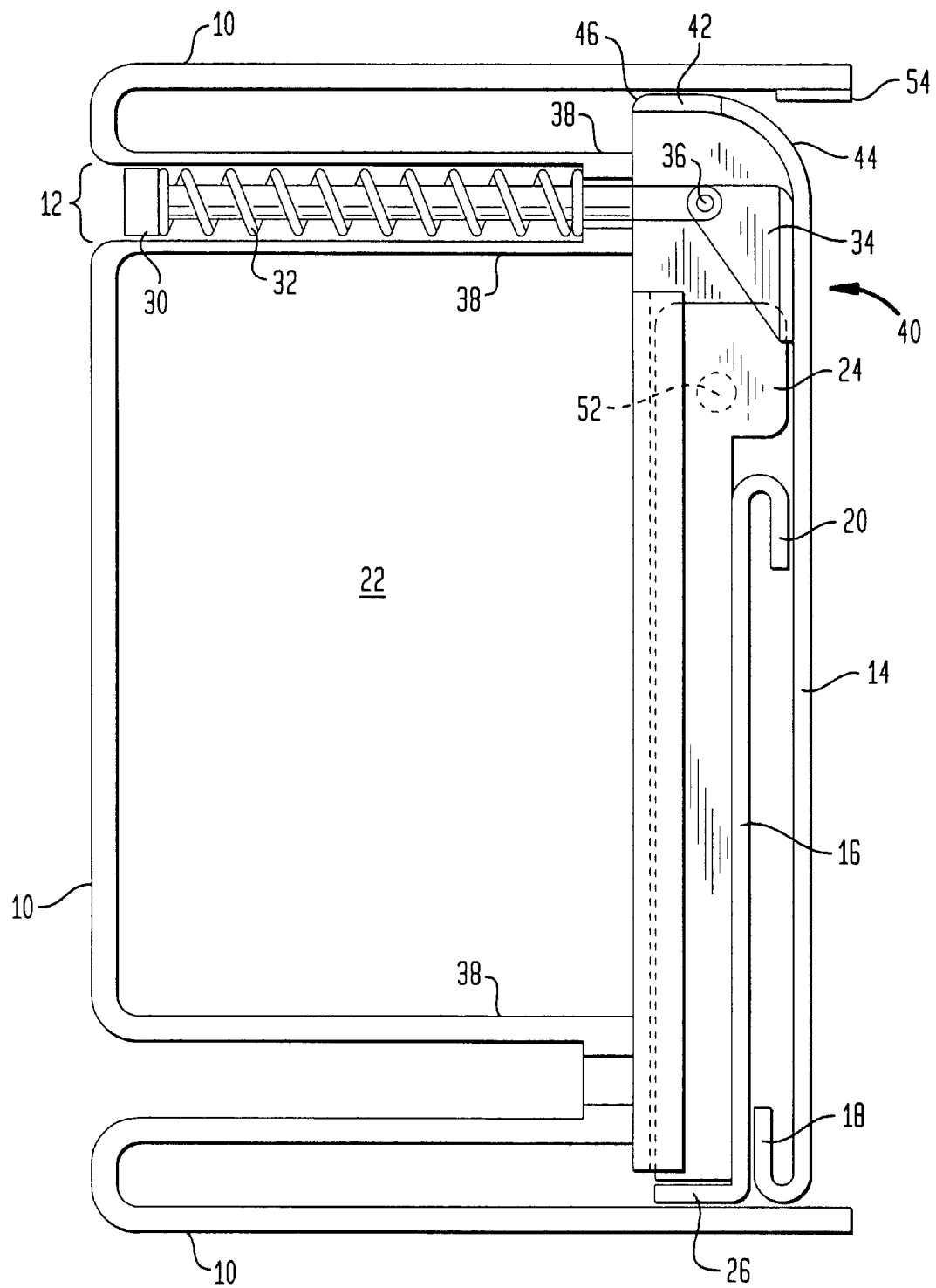
FIG. 1 is a side elevational cutaway view of a retractable weather shield mounted to a structure in its closed position and constructed in accordance with a preferred embodiment of the present invention.

FIG. 1 depicts an internally mounted retractable weather shield according to a preferred embodiment of the present invention. The weather shield, generally depicted as 40, includes a base panel 14, mounted to a structure, such as for example a Building Entrance Protector (BEP) 10, via a mounting hinge, generally depicted as 12. The mounting hinge 12 is connected to shield 40 through a boss 38 in BEP 10. Shield 40 may further comprise a telescoping panel 16 which nests substantially within base panel 14. Shield 40 is constructed of metal or plastic or any other suitable material having the necessary rigidity and weather resistant characteristics to carry out the functions described herein. As seen in FIG. 1, when shield 40 is in a closed, substantially vertical direction, the shield overlies the BEP interior 22 and preferably, but not necessarily, contacts a lower boss 38.

Referring to FIGS. 1–5, mounting hinge 12 comprises a retention pin 30, a spring 32, a hinge bracket 34 and a hinge pin 36. Hinge bracket 34 is attached to shield 40 in any conventional manner, such as for example by welding, gluing, bolting, etc. Spring 32 is coaxially mounted over retention pin 30 (FIG. 1). Retention pin 30 is then inserted through boss 38, and attached to hinge bracket 34 via hinge pin 36. When shield 40 is in its closed position, spring 32 is compressed and biases shield 40 in its closed position. As seen in FIG. 8, when shield 40 is in its open, substantially horizontal position, spring 32 is compressed further and biases shield 40 in its open position. That is, spring 32 is preferably, but not necessarily, compressed more when shield 40 is in its open position than when it is in its closed position. Shield 40 has notches 42 to accept the retention pin 30 when shield 40 is in its open position. Accordingly, as more fully described below, mounting hinge 12 biases shield 40 in both an open and a closed position.

In accordance with the instant invention, and as can best be seen by FIGS. 1, 6, 8 and 9, the technician opens the outer door 28 of BEP 10 which reveals shield 40 mounted within. When shield 40 is in its storage position, shield 40 is in a substantially vertical closed position, overlying the BEP interior 22, and contacting lower boss 38. To deploy the shield, the technician pulls upward on shield 40. As shield 40 is tilted upwards, spring 30 is compressed further, and shield 40 is biased back towards its closed position.

As seen in the FIG. 1, the top outside corner 44 of base panel 14 is substantially curved, while the inside top corner 46 of base panel 14 is minimally curved. Also, the distance between the hinge pin 36 and the surface of upper boss 38 which contacts the back inside surface of base panel 14, is smaller than the distance between hinge pin 36 and the top inside corner 46 of base panel 14. As seen in FIG. 1, when shield 40 is in its closed, stored position, shield 40 rests against a lower boss 38 within BEP 10. As the technician tilts shield 40 upwards, the back inside surface of base panel 14 pivots on upper boss 38, further compressing spring 32. When shield 40 reaches about a 45 degree angle, top inside corner 46 of base panel 14 begins to pivot on boss 38. As seen in FIG. 8, once the top inside corner 46 passes retention pin 30, shield 40 is biased upwards into an open position. Once shield 40 pivots to about a substantially horizontal position, the top surface of base panel 14 may contact the underside of the top wall of BEP 10. A holding means 54 (FIG. 8, as discussed below) may optionally be provided on the inside surface of the top of BEP 10 and/or at the point where the top of base panel 14 contacts BEP 10, to hold the base panel in the deployed position. Alternatively, the base panel 14 may be held open by the biasing of hinge 12 alone.

In the open position, spring 32 is more compressed then when shield 40 is in its closed position. Spring 32 is most compressed when shield 40 is about half way between its open and closed positions, or when top inside corner 46 comes into line with hinge pin 36 and retention pin 30. Accordingly, shield 40 is biased in both an open and closed position, and the open and closed positions are approximately 90 degrees apart, and the bias shifts at the approximate halfway point between positions.

In a preferred embodiment, shield 40 also comprises one or more telescoping panels 16. As best seen in FIG. 7, telescoping panel 16 is slidably mounted and supported within base panel 14. That is, the side walls 48 of base panel 14 are L-shaped to support the underside of side walls 50 of telescoping panel 16. Also, the inside surface of base panel 14 side wall 48 has a retention means 52 for frictionally engaging a corresponding detent 56 on an outside surface of telescoping panel 16 side wall 50. Such means may be, for example, a raised portion 52 which matingly engages a detent 56 to form a frictional snap fit between panels 14 and 16. The person of skill will recognize numerous other methods of effectuating the retention means, such as, for example, mating tabs, changes in wall thickness, and the like. Therefore, when telescoping panel 16 is fully retracted in its closed and stored position within base panel 14, the retention means 52 frictionally fits with detent 56 and maintains telescoping panel 16 within base panel 14, and keeps telescoping panel 16 from sliding out when the technician begins to tilt shield 40 upwards. In order to deploy telescoping panel 16, the technician pulls outward on handle 26 with enough force to disengage the retention means 52. Telescoping panel 16 then slides out of base panel 14 to a deployed position wherein telescoping panel 16 is substantially outside of base panel 14. As seen in FIG. 8, base panel 14 has an interlocking hook 18, and telescoping panel 16 has a mutually opposed interlocking hook 20. When telescoping panel 16 is fully extended, the mutually opposing hooks 18 and 20 engage one another, providing a water proof seal. That is, when mutually opposing hooks 18 and 20 engage one another, water cannot flow backwards from the telescoping panel 16 to the base panel 14 towards the BEP 10. Also, as seen in FIG. 8, telescoping panel 16 also has a stabilizing portion 24 which maintains sliding contact with the underside of the top surface of base panel 14. Stabilizing portion 24 helps provide for a more stable structure during deployment of telescoping panel 16 and when telescoping panel 16 is fully deployed. That is, because stabilizing portion 24 maintains sliding contact with the underside of the top surface of base panel 14, stabilizing portion 24 prevents telescoping panel 16 from tilting downward too far as telescoping pane 16 is deployed. Stabilizing portion 24 could be shaved down somewhat to provide a downward tilt to telescoping panel 16, such that telescoping panel 16 is not parallel to base panel 14 when open. In any event, when shield 40 is deployed, it extends substantially perpendicular to BEP 10. Also, the upper face of the base panel, and telescoping panels within, may be sloped or somewhat v-shaped, e.g., where the center is higher than the sides, to aid in guiding water towards the sides of the shield and away from the BEP, (not shown).

In a preferred embodiment, as discussed above and as seen in FIG. 8, a holding means 54 is provided on the inside surface of the top of BEP 10 at a point where the top of base panel 14 contacts the BEP 10 upon deployment. For example, in the presence of a heavy wind, or snow, some additional support may be desired to assist in maintaining the shield 40 in its deployed position. By way of a non-limiting example, holding means 54 could be a magnet (if the shield is metallic), opposing strips of hook and loop material such as Velcro™ or the like, a snap, or some sort of latch to aid in holding the shield 40 in its deployed position as a matter of design choice. However, it should be noted that the bias of mounting hinge 12 is preferably sufficient to hold the shield 40 in its deployed position without the assistance of any additional means. Accordingly, when the shield 40 is deployed, the BEP interior 22 is protected from the elements, and the technician may also be protected from harmful rays from the sun.

One skilled in the art will also recognize that more than one telescoping panel can be provided without departing from the spirit of the invention. That is, each successive panel need only be smaller than its preceding panel, and constructed in a similar fashion as the panels herein described. By providing more than one telescoping panel, the shield would extend further out from the BEP without increasing the overall size of the shield when it is in its stored position. The number of telescoping panels provided is merely a matter of design choice, depending on how large a deployed shield is desired.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed is:

1. An internally mounted retractable weather shield for protecting the interior of an outdoor structure from the elements, comprising:

a base panel;

a mounting hinge adapted to hingably mount said base panel within a structure at a mounting point proximate an upper portion of said structure; and said base panel being hingably movable between a stored position wherein said base panel is adapted to be stored within said structure and overlying said interior and a deployed position wherein said base panel is adapted to extend from said mounting point substantially perpendicular to said interior so as to shield said interior from the elements, wherein said base panel is not flat.

2. The weather shield as claimed in claim 1, wherein said base panel is alternately biased in said stored position and said deployed position by said mounting hinge.

3. The weather shield as claimed in claim 2, wherein said stored position and said deployed position are about 90 degrees apart.

4. The weather shield as claimed in claim 3, wherein said bias alternates when said base panel is approximately half way between said stored position and said deployed position.

5. The weather shield as claimed in claim 2, wherein said structure is a Building Entrance Protector.

6. The weather shield as claimed in claim 2 wherein said base panel is so shaped as to cause liquids deposited on an upper surface of said shield when in said deployed position to travel away from said structure.

7. The weather shield as claimed in claim 1, further comprising a telescoping panel being slidably mounted and supported within said base panel.

8. The weather shield as claimed in claim 7, wherein said telescoping panel is not flat.

9. The weather shield as claimed in claim 7, wherein said base panel is so shaped as to cause liquids deposited on an upper surface of said shield when in said deployed position to travel away from said structure.

10. The weather shield as claimed in claim 7, wherein said telescoping panel is stored substantially within said base panel when in a first position and extends substantially outside said base panel when in a second position.

11. The weather shield as claimed in claim 7, wherein said base panel and said telescoping panel each have mutually opposing inter-engageable hooks.

12. The weather shield as claimed in claim 11, wherein said base panel inter-engageable hook engages said telescoping panel inter-engageable hook when said telescoping panel is in said second position.

13. The weather shield as claimed in claim 11, wherein said inter-engageable hooks prevent liquid from flowing from a top surface of said telescoping panel to an inside surface of said base panel.

14. The weather shield as claimed in claim 10, wherein said telescoping panel has a stabilizing portion which contacts a top surface of said base panel when in said second position.

15. The weather shield as claimed in claim 14, wherein said stabilizing portion is constructed such that said telescoping panel is not parallel to said base panel when in said second position.

16. The weather shield as claimed in claim 10, wherein said telescoping panel has a handle to said in moving said telescoping panel from said first position to said second position.

17. The weather shield as claimed in claim 10, wherein said base panel has a retention means for maintaining said telescoping panel in said first position.

18. The weather shield as claimed in claim 10, wherein said telescoping panel has a second retention means for maintaining said telescoping panel in said second position.

19. The weather shield as claimed in claim 3, further comprising means for holding an upper surface of said base panel against said structure when said base panel is in said deployed position.

20. An internally mounted retractable weather shield for protecting the interior of an outdoor structure from the elements, comprising:

a base panel:

a mounting hinge adapted to hingably mount said base panel within a structure at a mounting point proximate an upper portion of said structure; and said base panel being hingably movable between a stored position wherein said base panel is adapted to be stored within said structure and overlying said interior and a deployed position wherein said base panel is adapted to extend from said mounting point substantially perpendicular to said interior so as to shield said interior from the elements and wherein said base panel is alternately biased in said stored position and said deployed position by said mounting hinge;

said mounting hinge comprising:
  a retention pin having a widened head end;
  a spring coaxially mounted over said retention pin;
  a hinge bracket mounted to said weather shield; and
  said retention pin having a portion adapted to be mounted through a hole in said structure proximate said mounting point and adapted to extend within said structure for connection to said hinge bracket by a hinge pin inserted through said retention pin at a point opposite said head end, such that said spring is compressed between said head end and a surface of said structure proximate said hole.

21. The weather shield as claimed in claim 20, wherein said spring is at a first compression state when said weather shield is in said stored position and said spring is at a second compression state when said weather shield is in said deployed position.

22. The weather shield as claimed in claim 21, wherein said spring is more compressed when in said first compression state then when in said second compression state.

23. The weather shield as claimed in claim 20, wherein said mounting point contacts said weather shield at a first shield surface when said shield is in said stored position and contacts said shield at a second shield surface when said shield is in said deployed position.

24. A method of using an internally mounted retractable weather shield for protecting the interior of an outdoor structure from the elements comprising the steps of:

(a) moving a weather shield, adapted to be hingably mounted within said structure at a mounting point proximate an upper portion of said structure, from a stored position, wherein said weather shield is adapted to be stored within said structure and overlying said interior, to a deployed position, wherein said weather shield extends from said mounting point substantially perpendicular to said interior so as to shield said interior from the elements, said weather shield being alternately biased in said stored position and said deployed position by said mounting hinge; and (c) sliding out a telescoping panel slidably mounted and supported within said weather shield.

25. A mounting hinge connecting a weather shield within an outdoor structure comprising:

a retention pin having a widened head end;

a spring coaxially mounted over said retention pin;

a hinge bracket mounted to said weather shield; and said retention pin having a portion adapted to be mounted through a hole in said structure proximate said mounting point and extending within said structure for connection to said hinge bracket by a hinge pin inserted through said retention pin at a point opposite said head end, such that said spring is compressed between said head end and a surface of said structure proximate said hole.

26. The mounting hinge of claim 25, wherein said spring is at a first compression state when said weather shield is in a stored position and said spring is at a second compression state when said weather shield is in a deployed position.

27. The mounting hinge of claim 26, wherein said spring is more compressed when in said first compression state then when in said second compression state.

28. The mounting hinge of claim 25, wherein said mounting point is at an upper end of said structure.

29. The mounting hinge of claim 26, wherein said spring biases said weather shield towards said stored position.

30. The mounting hinge of claim 29, wherein said spring alternately biases said weather shield towards said deployed position.

31. The mounting hinge of claim 26, wherein said mounting point contacts said weather shield at a first shield surface when said shield is in said stored position and contacts said shield at a second shield surface when said shield is in said deployed position.

32. The mounting hinge of claim 30, wherein said bias alternates when said weather shield is approximately half way between said stored position and said deployed position.

* * * * *